United States Patent
Ihle et al.

(10) Patent No.: US 8,354,024 B2
(45) Date of Patent: Jan. 15, 2013

(54) REFRIGERATION DEVICE AND WATER FILTER FOR SAID DEVICE

(75) Inventors: Hans Ihle, Giengen (DE); Andreas Kempte, Zschopau (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 500 days.

(21) Appl. No.: 12/085,138

(22) PCT Filed: Oct. 19, 2006

(86) PCT No.: PCT/EP2006/067577
§ 371 (c)(1),
(2), (4) Date: May 16, 2008

(87) PCT Pub. No.: WO2007/062915
PCT Pub. Date: Jun. 7, 2007

(65) Prior Publication Data
US 2009/0288439 A1    Nov. 26, 2009

(30) Foreign Application Priority Data

Nov. 30, 2005 (DE) .......................... 10 2005 057 137

(51) Int. Cl.
*B01D 27/08* (2006.01)
*B01D 35/30* (2006.01)
*F25D 23/12* (2006.01)

(52) U.S. Cl. .............................. 210/238; 62/389; 62/390

(58) Field of Classification Search ................... 210/238; 62/389, 390
See application file for complete search history.

(56) References Cited

U.S. PATENT DOCUMENTS

| | | | |
|---|---|---|---|
| 5,000,847 A * | 3/1991 | Huang | 210/238 |
| 5,328,606 A * | 7/1994 | Warren et al. | 210/238 |
| 5,670,042 A * | 9/1997 | Clausen et al. | 210/238 |
| 5,707,518 A * | 1/1998 | Coates et al. | 210/232 |
| 6,355,177 B2 | 3/2002 | Senner et al. | |
| 8,001,801 B2 * | 8/2011 | Coleman | 62/318 |
| 2002/0017497 A1 * | 2/2002 | Fritze | 210/767 |
| 2003/0024259 A1 * | 2/2003 | Jenkins et al. | 62/318 |
| 2003/0222010 A1 * | 12/2003 | Bassett et al. | 210/312 |
| 2004/0211717 A1 | 10/2004 | Mitchell et al. | |
| 2005/0161394 A1 * | 7/2005 | Fritze et al. | 210/435 |
| 2005/0247620 A1 | 11/2005 | Jenkins, Jr. et al. | |
| 2007/0227959 A1 * | 10/2007 | Sinur et al. | 210/232 |

FOREIGN PATENT DOCUMENTS

EP    1 139 045    10/2001

OTHER PUBLICATIONS

International Search Report PCT/EP2006/067577, Jan. 2007.

\* cited by examiner

*Primary Examiner* — Thomas M Lithgow
(74) *Attorney, Agent, or Firm* — James E. Howard; Andre Pallapies

(57) ABSTRACT

A water filter for a refrigeration appliance has a housing (1), which contains a filter material and has a fitting for mounting in a filter socket (2) at one end. A grip portion (8) is attached to an opposite end (3) of the housing (1).

11 Claims, 1 Drawing Sheet

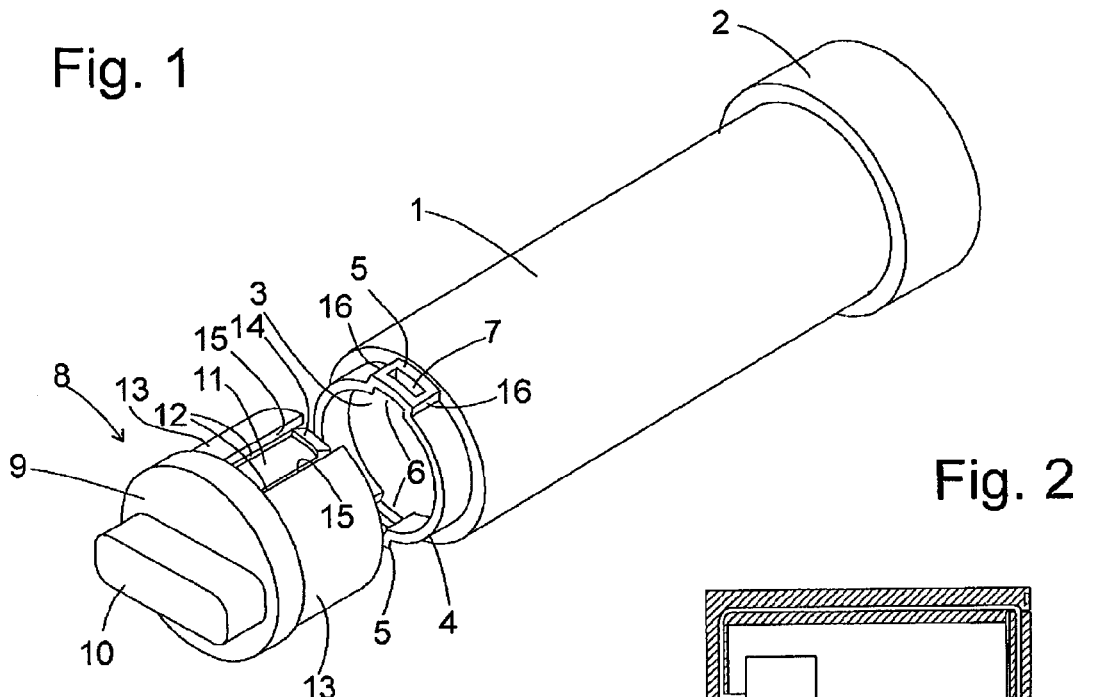
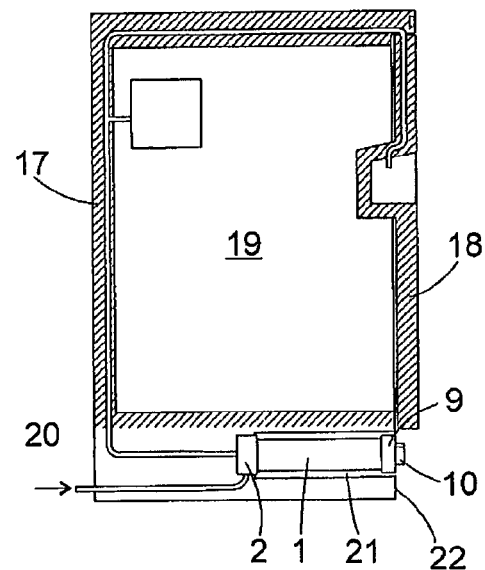
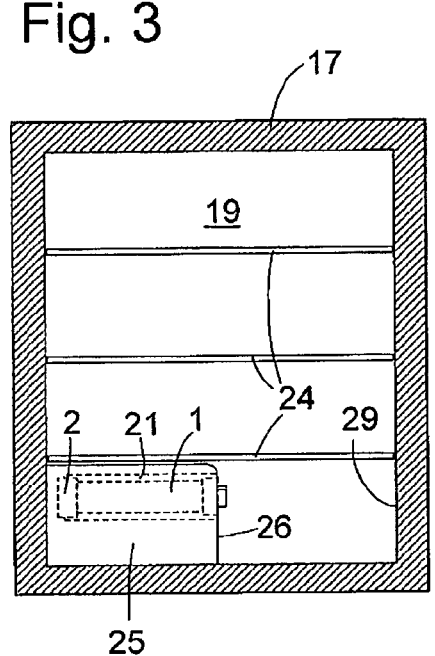
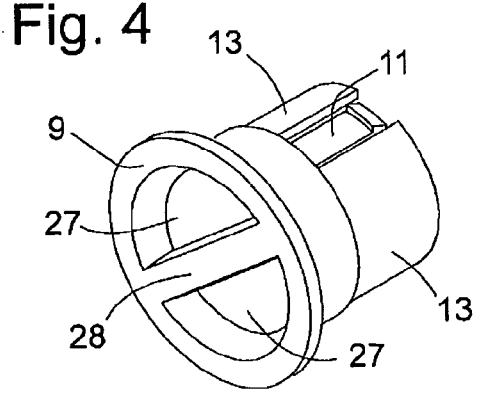

REFRIGERATION DEVICE AND WATER FILTER FOR SAID DEVICE

BACKGROUND OF THE INVENTION

The present invention relates to a refrigeration appliance and a water filter for a refrigeration appliance. Water filters are used in refrigeration appliances to remove chlorine or other carriers of unwanted flavor or odor from mains water, which is used for example to supply an internal ice-maker in the refrigeration appliance or a chilled water dispenser.

Such a refrigeration appliance is known for example from U.S. Pat. No. 6,355,177 B2. Here the water filter is mounted in the center of an internal chamber of the refrigeration appliance below the cover and projects into the internal chamber, which hinders utilization of the internal chamber. It would be desirable per se to be able to position the filter at least in a corner of the internal chamber, to have as little impact on utilization capacity as possible. However the problem then arises that a user finds it difficult to remove the filter from its socket by rotation to replace it, if said user cannot grip the entire periphery of the filter housing.

BRIEF SUMMARY OF THE INVENTION

The object of the present invention is to create a water filter for a refrigeration appliance and a refrigeration appliance equipped therewith, with which the water filter has no or only a small impact on the utilization capacity of the internal chamber of the refrigeration appliance.

The object is achieved by a water filter with a housing, which contains a filter material and has a fitting for mounting in a filter socket at one end and wherein a grip portion is attached to an opposite end of the housing. The grip portion means that it is possible to rotate the filter housing or to move it in another manner necessary to release it from the filter socket, without space having to be left free around the filter housing for a user's hands. It is therefore possible to position the filter in a corner of the internal chamber of a refrigeration appliance without thereby having an adverse effect on its ability to be handled.

It is also possible to house the filter in a hollow chamber provided specifically for it, with the grip portion then expediently closing off an opening in the hollow chamber.

It is particularly preferable for the opening to be formed in an outer wall of the refrigeration appliance, so that a user can access the filter without having to open the door of the appliance to do so.

The grip portion can be latched to, pushed onto or adhered to the filter housing.

The connection between the grip portion and housing is preferably such that it cannot be released. This allows the manufacturer of the refrigeration appliance to identify clearly for the user those filters of a specific type from any one filter manufacturer, which have been tested and found to be suitable, unambiguously and in a manner that cannot be falsified, as suitable for refrigeration appliances manufactured by them by providing a grip portion that is specific to the refrigeration appliance manufacturer. A specific identification for respectively specified refrigeration appliance models from a manufacturer is also possible. Thus for example a specific coloring or shape can produce a recognition effect in the user, allowing said user to identify the filter suitable for their refrigeration appliance from a range of filters available, without having to know the model reference of the refrigeration appliance precisely.

BRIEF DESCRIPTION OF THE DRAWINGS

Further features and advantages of the invention will emerge from the description which follows of exemplary embodiments with reference to the accompanying figures, in which:

FIG. 1 shows a perspective view of a filter cartridge and a grip portion suitable for attachment to the filter cartridge;

FIG. 2 shows a schematic section through a refrigeration appliance equipped with the inventive water filter according to a first embodiment;

FIG. 3 shows a schematic section through a refrigeration appliance with water filter according to a second embodiment; and FIG. 4 shows a perspective view of an alternative grip portion.

DETAILED DESCRIPTION OF THE PRESENT INVENTION

The filter cartridge shown in FIG. 1 has an essentially cylindrical housing 1, which contains a filter material such as for example active carbon in a manner known per se and is anchored with an open end in a releasable manner by means of a screw or bayonet coupling (not shown) in a filter socket 2, which has inflow and outflow connections for water. An approximately annular web 4 projects from the end face 3 of the housing 1 facing away from the filter socket 2. The diameter of the web 4 is somewhat smaller than that of the end face 3, and projections 5, two in number in the example shown, are formed at regular intervals on the outer periphery of the web 4. A recess 6 on the inside of the web 4 corresponds to each of the projections 5. Windows 7 are broken through the web 4 at the level of the projections 5 and recesses 6.

A grip portion provided for attachment to the housing 1 is injection molded from plastic. A circular base plate 9 of the grip portion supports a rib 10 extending diametrically over the base plate 9 and easily grasped by a user in order to rotate the grip portion 9, on a face facing away from the filter cartridge. On the face of the base plate 9 facing the filter cartridge are two elastic latching tongues 11, only one of which is visible in the figure. Arc-shaped walls 13 extend between the two latching tongues 11, removed respectively from these by a narrow gap 12.

When the grip portion 8 is positioned on the filter housing 1, the latching tongues 11 engage in the recesses 6, while the walls 13 come to rest around the segments of the web 4 between two projections 5. The dimensions of the latching tongues 11 and the walls 13 in the positioning direction are specified such that when the walls 13 touch the front face 3 of the housing 1, barbs 14 on the latching tongues 11 engage likewise in the window 7, thus anchoring the grip portion 8 to the housing.

To ensure that the grip portion is anchored to the housing in a manner such that it cannot be released, the windows 7 can be closed off on the outside, so that it is not possible for the latching tongues to be pushed back and the grip portion to be detached from the housing.

A considerable torque can be transmitted between the grip portion 8 and the filter housing 1, in that edges 15 of the walls 13 press respectively against lateral flanks 16 of the projections 5.

Instead of a latch, as shown in FIG. 1, it would of course also be possible to secure the grip portion to the housing by adhesion, it being possible to provide engagement between complementary non-round projections and recesses in the housing and grip portion for torque transmission.

FIG. 2 shows a schematic section through a first exemplary embodiment of a refrigeration appliance, which is equipped with the inventive filter. The refrigeration appliance has a thermally insulated body 17 and a door 18 affixed thereto in the manner known per se, both together bounding an internal chamber 19. The filter cartridge is held in a tubular recess 21, which is open to the front, in a base region 20 below the body. When its housing 1 is anchored correctly in the base 2, the outside of the base plate 9 of the grip portion 8 is flush with a front panel 22 of the appliance. It is thus possible for a user to identify incorrect installation of the filter, which may result in the discharge of water, quickly and easily from the fact that these surfaces are not flush. The rib 10 of the grip portion 8 extending over the front panel can be reached easily by a user, so that said user can then rotate it and anchor the filter in the base 2 or release it therefrom.

A second example of the attachment of the filter is shown in FIG. 3. This shows a section through the body of a refrigeration appliance in a plane parallel to the door. The internal chamber 19 of the refrigeration appliance is divided by support plates 24 into a number of compartments, with a projection 25 being formed at the level of the lowest compartment on the rear wall of the appliance, in order to house a compressor and in some instances other parts of the refrigerant circuit of the refrigeration appliance behind it in the manner known per se. A tubular recess 21, which holds the filter, extends inside the projection 25 parallel to the plane of the section and opens into the internal chamber 19 on a side wall 26 of the projection 25. The recess 21 is separated from the compressor and other heat-emitting elements of the refrigerant circuit by an insulating layer (not shown) but is in close thermal contact with the internal chamber 19, so that the water is already cooled in the filter.

FIG. 3 shows the filter with a grip portion 8 of the type shown in FIG. 2. Its rib 10, which projects over the side wall 26, prevents efficient space utilization, in particular if the lower compartment is to be provided with pull-out boxes for example. An alternative embodiment of the grip portion, which avoids this problem, is shown in FIG. 4. With this two roughly semi-circular hollows 27 are formed in the base plate 9 of the grip portion 8, between which a rib 28 extends with an apex that is flush with the outside of the base plate 9. When this grip portion is sunk in a recess with the base plate 9 flush with its surroundings, the grip portion does not project but the rib 28 is still easy to grasp. Compared with the embodiment in FIG. 3 this means that since there is no projecting rib 10 when the grip portion in FIG. 4 is used, all the space between the side wall 26 of the projection 25 and a side wall 29 of the body opposite can be filled by a pull-out box.

The invention claimed is:

1. A water filter for a refrigeration appliance comprising:
   a housing; the housing containing a filter material and having opposed ends; the housing including an annular web projecting from one end of the housing and the housing is adapted for mounting in a filter socket at an opposite end of the housing; and
   a rotatable grip portion; the rotatable grip portion including a plurality of elastic latching tongues that attach to the one end of the housing.

2. The water filter as claimed in claim 1, wherein the rotatable grip portion is latched to the housing.

3. The water filter as claimed in claim 1, wherein the rotatable grip portion is pushed into the housing.

4. The water filter as claimed in claim 1, wherein the rotatable grip portion is connected to the housing in a manner such that it cannot be released.

5. The water filter for a refrigeration appliance as claimed in claim 1 further including a hollow chamber associated with the refrigeration appliance; the hollow chamber having an opening; the water filter being held in the hollow chamber; the rotatable grip portion closing off the opening in the hollow chamber.

6. The water filter for a refrigeration appliance with a water filter as claimed in claim 5, wherein the opening is formed in an outer wall of the refrigeration appliance.

7. The water filter of claim 1, where the housing is cylindrical.

8. The water filter of claim 7, where the rotatable grip portion includes a rib extending from a circular baseplate.

9. The water filter of claim 8, where the rib is parallel to the cylindrical axis of the housing.

10. The water filter of claim 8, where the rib is orthogonal to the cylindrical axis of the housing.

11. The water filter of claim 7, where the rotatable grip portion includes a rib arranged in a recess in of the grip portion.

* * * * *

UNITED STATES PATENT AND TRADEMARK OFFICE
CERTIFICATE OF CORRECTION

PATENT NO. : 8,354,024 B2  Page 1 of 1
APPLICATION NO. : 12/085138
DATED : January 15, 2013
INVENTOR(S) : Ihle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 589 days.

Signed and Sealed this
First Day of September, 2015

Michelle K. Lee
*Director of the United States Patent and Trademark Office*